UNITED STATES PATENT OFFICE.

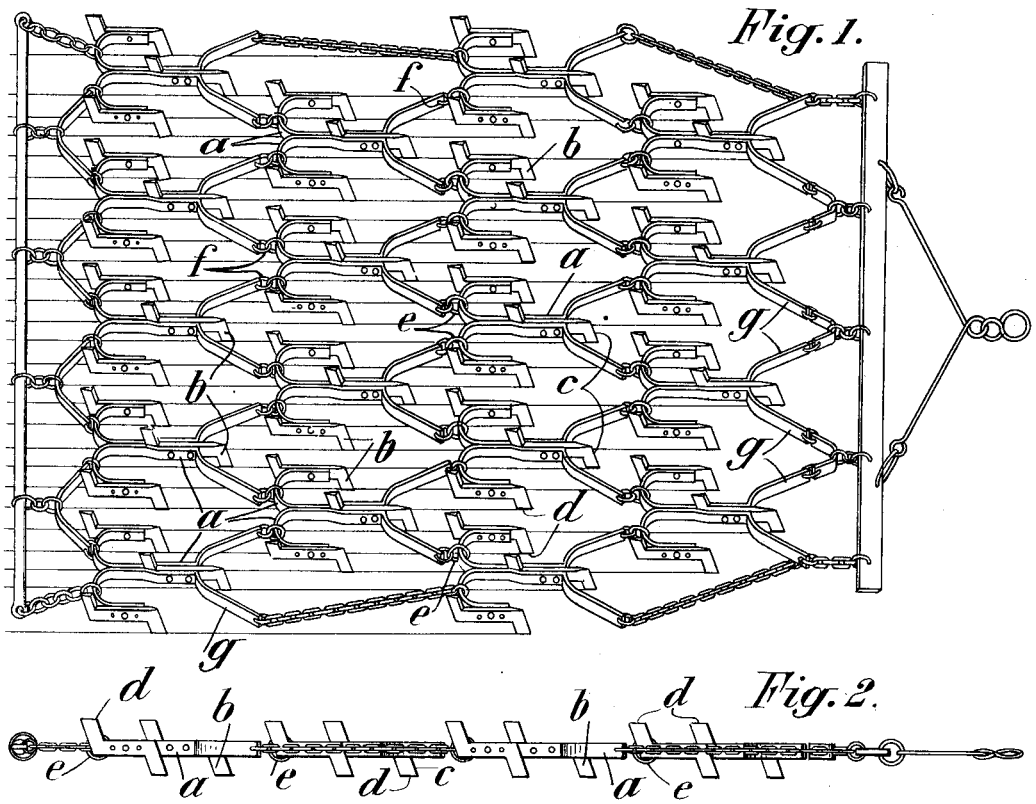

AUGUST GRÜNENWALD, OF TREUCHTLINGEN, AND VINCENZ WIDDER, OF RIEDLINGEN, GERMANY.

HARROW FOR MEADOWS.

1,035,000.   Specification of Letters Patent.   Patented Aug. 6, 1912.

Application filed September 20, 1911. Serial No. 650,425.

*To all whom it may concern:*

Be it known that we, AUGUST GRÜNENWALD and VINCENZ WIDDER, subjects of the German Emperor, and residents of Treuchtlingen, in Bavaria, Germany, and of Riedlingen, in Wurttemberg, Germany, have invented certain new and useful Improvements in Harrows for Meadows, of which the following is a specification.

The invention relates to that class of harrows used for harrowing meadows and the improvements consists in providing blades of such a shape that any obstruction of the harrow by the pulled out mass or weeds is avoided, said mass or weeds being allowed to rise instead of being twined around the blades. Furthermore said blades are mounted on improved carriers or connecting elements allowing the harrow to spread over a larger space, so that between the various elements or carriers larger spaces are secured, which facilitate the mass and weeds falling out of the harrow. Said improved blades are provided with two edges one of which is sharp and inclined toward the ground, the other one being only slightly inclined or running parallel to the ground. The last edge is not necessarily sharp and may be dull, because it serves only as a guide for the sharp edge. For allowing the weeds and the like to rise, the blades are secured on the carriers in such a manner that the downwardly bent working end extends somewhat beyond the securing point on the carrier. The different carriers or harrow elements are directly coupled together and the connecting means cannot rise nor get out of joint and yet they are readily disconnectible in such a manner that, the exterior carriers or harrow elements being removed, the harrow may easily be taken to pieces.

Figure 1 is a plan view, Fig. 2 a side elevation, and Figs. 3, 4, 5 and 6 are enlarged details.

The harrow shown in Fig. 1 is composed of the different hook shaped carriers or elements $a$ made of plate steel or other suitable material. They may be formed in two parts as shown in Figs. 1 and 3, or made in one single piece as shown in Fig. 5. On said carriers or elements the blades $b$ are secured in such a manner that one blade is placed in front and one blade on each end of the rear outwardly bended portions. Said blades $b$ are made of plate steel and are bent on one end or on both ends, thus forming the edges $c$ and $d$ (Fig. 4), one of said edges $c$ being sharp and inclined toward the ground, the other dull edge $d$ being only slightly inclined or running parallel to the ground, this last edge serving for guiding the edge $c$. The rear end of said blade $b$ is bent upwardly; said rear end may be suppressed if desired, its principal object being to allow the harrow to be employed as a drag or sledge; still if said bent rear end of the blade is formed like the correspondent front end $c$, $d$, said ends become interchangeable. The edge $d$ of the front end may also be suppressed, said end of the blade then being made pointed or sharp.

For connecting together the carriers or harrow elements $a$, said carriers are provided with rings $e$ which engage rings $f$ secured to the free arms $g$ of the next following element. Said connection is readily effected; it is cheap, durable and effective. After unscrewing the outer blades, the rings $e$ are unhooked; thus the different carriers or elements are set free and a harrow which is too heavy may be made smaller and vice versa.

For getting the proposed effect the blades $b$ are fixed on the carriers $a$ in such a manner that the bent working end extends several centimeters beyond the securing point on the carrier, so that the working edges $c$ and $d$ are allowed to work freely and easily.

The carriers or harrow elements $a$ may be of a different shape as shown in Figs. 5 and 6, but this different construction has no direct influence upon the working of the harrow and differently shaped carriers may be employed.

Having now fully described our said invention, what we claim and desire to secure by Letters Patent, is:

1. A harrow comprising a series of carriers, blades mounted on the carriers, each blade comprising a horizontal body portion, an upwardly extended portion at one end of the horizontal body portion, and a downwardly extended portion at the opposite end of said horizontal body portion, the upwardly and downwardly extended portions being flat and having sharpened edges, from their free ends to the horizontal portion, and means for securing the blades to the carriers.

2. A harrow comprising a plurality of carriers, each carrier having a central body portion formed at opposite ends with outwardly extended members, blades mounted on each carrier, each blade comprising a horizontal body portion having inclined projections at opposite ends, the inclined projections on each blade extending in opposite directions and each having a sharpened edge, and flexible connections between the carriers.

3. A harrow for meadows comprising a plurality of tool carriers, each of which is composed of plate steel bent to provide double arms, rings on the arms of said tool carriers, rings on the opposite ends of said tool carriers, the rings on each tool carrier being linked to the rings on the following tool carrier, for connecting said tool carriers together, and tool blades each of which is bent on both ends, each bent end having a sharp and a dull edge, said edges extending beyond the securing point on the carrier, whereby to pull out weeds and for allowing said weeds to rise and fall out of the harrow without twining around the edges of the blades or obstructing the harrow.

In testimony whereof we have hereunto set our hands in presence of two witnesses.

AUGUST GRÜNENWALD.
V. WIDDER.

Witnesses:
ARTHUR V. W. COXE,
MATHILDE K. HELD.

---

Copies of this patent may be obtained for five cents each, by addressing the "Commissioner of Patents, Washington, D. C."